United States Patent [19]

Anderson

[11] 4,287,169

[45] * Sep. 1, 1981

[54] WATER DISSOCIATION METHOD AND MATERIAL

[75] Inventor: Eugene R. Anderson, Wills Point, Tex.

[73] Assignee: Horizon Manufacturing Corporation, Wills Point, Tex.

[*] Notice: The portion of the term of this patent subsequent to Jan. 8, 1997, has been disclaimed.

[21] Appl. No.: 110,217

[22] Filed: Jan. 7, 1980

Related U.S. Application Data

[63] Continuation-in-part of Ser. No. 902,705, May 4, 1978, Pat. No. 4,207,095, and Ser. No. 902,708, May 4, 1978, Pat. No. 4,182,748, and Ser. No. 68,749, Aug. 23, 1979, and Ser. No. 85,374, Oct. 16, 1979.

[51] Int. Cl.$^3$ .......................... C01B 1/07; C01B 13/02
[52] U.S. Cl. ................................. 423/579; 75/134 N; 423/657
[58] Field of Search .................. 423/579, 657, 648 R; 75/134 N, 134 F

[56] References Cited

U.S. PATENT DOCUMENTS

| | | | |
|---|---|---|---|
| 2,083,648 | 6/1937 | Gorke | 423/641 X |
| 2,837,408 | 6/1958 | Sakowski | 423/657 X |
| 3,313,598 | 4/1967 | Glukstein | 423/657 X |
| 3,490,871 | 1/1970 | Miller et al. | 423/657 |
| 3,540,854 | 11/1970 | Brooke et al. | 423/657 X |
| 3,833,357 | 9/1974 | Bianchi et al. | 423/657 X |
| 3,985,866 | 10/1976 | Oda et al. | 423/657 |
| 4,182,748 | 1/1980 | Anderson | 423/579 |

FOREIGN PATENT DOCUMENTS

| | | | |
|---|---|---|---|
| 337722 | 2/1904 | France | 423/657 |
| 3188 | of 1909 | United Kingdom | 423/657 |

*Primary Examiner*—Edward J. Meros
*Attorney, Agent, or Firm*—Gerald G. Crutsinger; John F. Booth; Harry C. Post, III

[57] ABSTRACT

A material and method for the decomposition/dissociation of water into hydrogen and oxygen is disclosed. The material comprises an amalgam of an alkali metal, mercury, and aluminum combined with a catalytically effective amount of an alloy comprising a metal selected from the platinum metal family and at least one metal selected from the group consisting of germanium, antimony, gallium, thallium, indium, cadmium, bismuth, lead, zinc and tin.

28 Claims, No Drawings

WATER DISSOCIATION METHOD AND MATERIAL

CROSS-REFERENCE TO RELATED APPLICATIONS

This application is a continuation-in-part of Application Ser. No. 902,705, entitled MATERIAL AND METHOD FOR OBTAINING HYDROGEN BY DISSOCIATION OF WATER, filed on May 4, 1978, now U.S. Pat. No. 4,207,095; of Application Ser. No. 902,708, entitled MATERIAL AND METHOD FOR OBTAINING HYDROGEN AND OXYGEN BY DISSOCIATION OF WATER, filed on May 4, 1978, now U.S. Pat. No. 4,182,748; of Application Ser. No. 68,749, entitled MATERIAL AND METHOD FOR OBTAINING HYDROGEN BY DISSOCIATION OF WATER, filed on Aug. 23, 1979; and of application Ser. No. 85,374, entitled MATERIAL AND METHOD TO DISSOCIATE WATER AT CONTROLLED RATES, filed on Oct. 16, 1979; and is related to application Ser. No. 85,373, entitled HYDROGEN GENERATING APPARATUS AND METHOD, filed on Oct. 16, 1979; and to application Ser. No. 56,994, entitled FUEL SYSTEM AND METHOD, filed on July 12, 1979.

BACKGROUND OF THE INVENTION

1. Field of Invention

This invention relates to a material for and method of effecting the decomposition/dissociation of water into hydrogen and oxygen.

The water is reacted with an amalgam of sodium, aluminum and mercury to form hydrogen and a metallic hydroxide denoted by the formula $Na_3Al(OH)_6$. The $Na_3Al(OH)_6$ is unstable at the temperature of formation in the presence of a catalyst comprising platinum and at least one element selected from the group consisting of germanium, antimony, gallium, thallium, indium, cadmium, bismuth, lead, zinc and tin and breaks down to form metallic sodium and aluminum thereby releasing oxygen and hydrogen.

2. Description of the Prior Art

It is well known in the prior art that the alkali metals react with water to form hydrogen and the stable alkali metal hydroxide. The foregoing reaction is rapid, the heat generated intense and explosion of hydrogen ordinarily occurs. The result is an unsatisfactory and dangerous method of generating hydrogen. It is also well know that alkali metal peroxides may be used for the generation of oxygen (see U.S. Pat. No. 3,574,561).

Thermochemical cycles comprising metal-metaloid combinations for the generation of both hydrogen and oxygen are disclosed in U.S. Pat. No. 3,969,495.

Closed cycle processes for dissociation of water into hydrogen and oxygen are disclosed in U.S. Pat. Nos. 3,821,358, 3,928,549 and 4,011,305. Combinations of various metals in multistep processes for dissociation of water are, therefore, well known; however, the simple and facile manner of producing hydrogen and oxygen utilizing an amalgam of alkali metal, aluminum and mercury combined with a catalytic alloy comprising platinum and at least one element selected from the group consisting of germanium, antimony, gallium, thallium, indium, cadmium, bismuth, lead, zinc and tin has not been heretofore appreciated.

DESCRIPTION OF THE INVENTION

The material I have found to be suitable for the generation of hydrogen and oxygen from water without spontaneous combustion of the resultant evolved hydrogen and oxygen gases comprises an amalgam of (1) an alkali metal such as lithium, sodium, potassium, cesium, or combinations thereof, (2) aluminum and (3) mercury combined with a catalytic alloy comprising a metal selected from the platinum metals family and at least one element selected from the group consisting of germanium, antimony, gallium, thallium, indium, cadmium, bismuth, lead, zinc and tin.

The particle size of the sodium and aluminum is such as to enable formation of an amalgam and may fall within the range of from about 10 to about 100 mesh. Most preferably, the particle size of the aluminum should be about 10 mesh. Alkali metal of $\frac{1}{4}''$ diameter is suitable. The particle size of either the alkali metal or aluminum is not critical since the foregoing metals and mercury readily intermix. The smaller the particle size, of course, the more rapid the mixing.

The atomic weight ratio of alkali metal to mercury is from about 1:100 to about 100:1 and the atomic weight ratio of alkali metal to aluminum is from about 1:100 to about 100:1. Preferably the atomic weight ratio of alkali metal to mercury is from about 3:1 to about 1:1.5 and the atomic weight ratio of alkali metal to aluminum is from about 1:1 to about 3:1.

The amalgam of alkali metal, aluminum and mercury is combined with a catalytically active alloy which is present in a catalytically effective amount and, at the conditions of hydrogen generation, functions to regenerate amalgam to the active metallic state.

It is essential that the catalyst/alloy contain a platinum group metal. The catalyst/alloy is generally comprised of a metal selected from the platinum metals family or group and at least one element selected from the group consisting of germanium, antimony, gallium, thallium, indium, cadmium, bismuth, lead, zinc and tin.

Preferably the catalyst comprises at least one element selected from the group consisting of germanium, antimony, gallium, thallium, indium and cadmium.

Catalytic activity is further enhanced by the addition of minor amounts of zirconium and chromium.

Lead and/or gold may be incorporated in the catalyst as an alloying element to lower the melting point of the alloy.

The alloy and amalgam may be combined in weight ratios of from about 1:1 to about 1:5 and preferably from about 1:2 to about 1:3.

In combining the alloy and amalgam they may be compounded with an extender. The extender functions both to dilute the amalgam-catalytic alloy combination and to provide a heat sump for heat generated during the dissociation of water by contact with the combined amalgam and catalytic alloy. The extender is preferably copper; however, admixtures of tin and bismuth or gallium may also function as extenders.

The combination of amalgam and alloy or amalgam, alloy and extender is most suitably used in solid block form, hereinafter referred to as a reactor block. Where an extender is employed it may be present as a major constituent of the reactor block.

Although not wishing to be bound by the following explanation, it is believed that the water reacts with the alkali metal, e.g., sodium, and the aluminum liberating hydrogen and forming $Na_3Al(OH)_6$. The $Na_3Al(OH)_6$ is unstable, and in the presence of the alloy at the conditions of Na$_3$Al(OH)$_6$ formation, the foregoing composition decomposes to form H$_2$, O$_2$ and regenerated amalgam. The alloy apparently functions to catalyze the decomposition, and thereby extends the useful life of the amalgam. The process may be depicted as follows:

$$2Na + 2H_2O \rightarrow 2NaOH + H_2$$

$$6H_2O + 2Al + 6NaOH \rightarrow 2Na_3Al(OH)_6 + 3H_2$$

$$Na_3Al(OH)_6 \xrightarrow{catalytic\ alloy} 3Na + Al + 3H_2 + 3O_2$$

It is preferred to include chromium as an additional component of the alloy. The incorporation of chromium as a component of the alloy appears to lower the heat of reaction. The chromium is generally present in the alloy in an amount measured on a weight percent basis of said alloy of from about 0.7% to about 1.1% and preferably for about 0.8% to about 0.9%.

Each of the components of the alloy may be present in amounts of from about 0.4% by weight to about 28.5% by weight based on the weight of the combined catalytic alloy and amalgam.

The preferred alloy comprises (1) a metal selected from the platinum metals group present in an amount of from about 0.4 to about 2.3% by weight, (2) lead present in an amount of from about 42.9 to about 71.5% by weight, (3) antimony present in an amount of from about 25.5 to about 42.5% by weight, (4) chromium present in an amount of from about 0.7 to about 1.1% by weight, (5) zirconium present in an amount of from about 4.1 to about 6.8% by weight and gold present in an amount of from about 0.6 to about 2.3% by weight.

A specific example of said preferred alloy comprises about 1.4 wt. % of the selected platinum group members, about 57.3 wt. % lead, about 34.0 wt. % antimony, about 0.9 wt. % chromium, about 5.4 wt. % zirconium and about 1.0 wt. % gold.

The amalgam of sodium, aluminum and mercury is prepared utilizing any of the well known procedures with the added proviso that an inert atmosphere be employed. Amalgamation may be facilitated by utilization of an elevated temperature, preferably around 200° C. ± 10° C. The amalgam is preferably maintained at this elevated temperature for about 10 minutes where 100 grams are being processed, and the time is extended about 1 minute for each additional 100 gram aliquot.

The resulting amalgam is cooled, generally to room temperature, utilizing an inert atmosphere. For this purpose either helium or nitrogen are satisfactory. Cooling is preferably effected in a desiccator to insure that no water contacts the amalgam.

As in the preparation of the amalgam and all other steps in the method of manufacture of the various compositions of this invention, precaution must be taken during preparation to avoid the presence of oxygen because it has been observed that oxygen operates to poison the resultant material.

The preparation of the alloy selected may be in any well known manner having in mind the proviso that an inert atmosphere be maintained.

The alloy, upon solidification, and as a practical matter, upon cooling is ground into a powder, preferably a fine powder of about 10 mesh or less. Cooling may be effected in a dessicator to insure the absence of oxygen and moisture, whose presence is detrimental during preparation. Grinding/pulverizing may be effected in any well known manner including use of a ball, hammer and/or stamp mill.

The objective in combining the alloy and amalgam is to intimately admix the two respective components. The specific manner of catalysis is not know, but generally catalysis is a surface phenomenon and consistent therewith in the instant invention it appears that the catalysis is related to both particle size and nature as well as uniformity of mixture of the amalgam and catalytic alloy.

The amalgam and catalytic alloy may be used (1) in particulate form such as a floating bed, or other intimate dispersion, (2) in the form of porous mass which may be formed by compression or sintering or (3) as a solid mass by alloying of the amalgam and catalytic alloy. By alloying, it is meant that the amalgam and catalytic alloy are combined to form an admixture and alloyed under inert conditions at a temperature above the melting point of said admixture.

In either of the foregoing forms an extender, such as gallium, tin, bismuth or copper, and preferably copper may be utilized. The extender functions to vary activity and as a heat sink to retain at least a portion of the heat of reaction of sodium aluminum hydroxide formation, whereby catalysis of the unstable hydroxide to the metal and oxygen and hydrogen is enhanced.

Admixture of extender with the amalgam and catalytic alloy is effected utilizing the extender in a particulate form of comparable size to the other components, which size is generally from about 10 to about 100 mesh.

EXAMPLE I

Preparation of Amalgam

An amalgam comprising 35.144 parts by weight of sodium, 13.749 parts by weight of aluminum and 51.107 parts by weight of mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 19.0 parts by weight lead, 11.3 parts by weight antimony 0.3 parts by weight platinum, 0.5 parts by weight gold, 1.8 parts by weight zirconium and 0.3 parts by weight chromium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by passing steam upwardly therethrough whereby steam is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere, is maintained. Thereafter the mass comprised of amalgam and alloy is transferred to a dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender

The amalgam and alloy prepared above and an extender of powdered copper of about 10 mesh are admixed in the following proportions:

21.775 parts by weight amalgam.
5.625 parts by weight alloy.
72.6 parts by weight copper (extender).

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product. The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a desiccator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.14 gallons of water per minute.

EXAMPLE II

Preparation of Amalgam

An amalgam comprising 37.688 parts by weight of aluminum 32.112 parts by weight sodium and 30.2 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 60.7 parts by weight lead, 0.8 parts by weight platinum and 38.5 parts by weight germanium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by passing steam upwardly therethrough whereby steam is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere is maintained. Thereafter the mass comprised of amalgam and alloy is transferred to a dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender

The amalgam and alloy prepared above and an extender of powdered copper of about 10 mesh are admixed in the following proportions:
21.775 parts by weight amalgam.
5.625 parts by weight alloy.
72.6 parts by weight copper.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a desiccator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.20 gallons of water per minute.

EXAMPLE III

Preparation of Amalgam

An amalgam comprising 22.947 parts by weight of aluminum 18.391 parts by weight sodium and 58.662 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 63.064 parts by weight lead, 0.45 parts by weight platinum, 36.036 parts by weight antimony and 0.45 parts by weight germanium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by immersion in water whereby water is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere is maintained. Thereafter the mass comprised of amalgam and alloy is transferred to a dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender

The amalgam and alloy prepared above and a powdered extender comprising 50 wt.% tin and 50 wt.% bismuth of about 10 mesh are admixed in the following proportions:
21.775 parts by weight amalgam
5.625 parts by weight alloy
72.6 parts by weight extender The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impringing thereon. Generally a 2.5 square cm surface will react with 0.12 gallons of water per minute.

EXAMPLE IV

Preparation of Amalgam

An amalgam comprising 19.383 parts by weight aluminum, 31.068 parts by weight potassium and 49.549 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 42.847 parts by weight lead, 2.429 parts by weight platinum, 42.847 parts by weight antimony, 2.429 parts by weight cadmium and 9.448 parts by weight zirconium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by spraying water on the admixture whereby water is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere, is maintained. Thereafter the mass comprised of amalgam and alloy is transferred to a dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender

The amalgam and alloy prepared above and an extender of powdered gallium of about 10 mesh are admixed in the following proportions:

21.775 parts by weight amalgam
5.625 parts by weight alloy
72.6 parts by weight gallium.

The weighing and blending of the foregoing metallic compounds should be done in an inert.atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter, the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally, a 2.5 square cm surface will react with 0.14 gallons of water per minute.

EXAMPLE V

Preparation of Amalgam

An amalgam comprising 37.688 parts by weight aluminum, 32.112 parts by weight cesium and 30.2 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 60.7 parts by weight lead, 0.8 parts by weight platinum and 38.5 parts by weight germanium are introduced into a graphite crucible which is thereafter palced in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by passing steam upwardly therethrough whereby steam is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere is maintained. Thereafter the mass comprised of amalgam and alloy is transferred to dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender The amalgam and alloy prepared above and an extender of powdered copper of about 10 mesh are admixed in the following proportions:

21.775 by weight amalgam
5.625 parts by weight alloy
72.6 parts by weight copper The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.20 gallons of water per minute.

EXAMPLE VI

Preparation of Amalgam

An amalgam comprising 35.144 parts by weight of sodium, 13.749 parts by weight of aluminum and 51.107 parts by weight of mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 19.0 parts by weigth lead, 11.3 parts by weight antimony 0.318 parts by weight iridium, 0.5 parts by weight gold, 1.8 parts by weight zirconium and 0.3 parts by weight chromium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by passing steam upwardly therethrough whereby steam is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite metal conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere, is maintained. Thereafter the mass comprised of amalgam and alloy is transferred to a dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender

The amalgam and alloy prepared above and an extender of powdered copper of about 10 mesh are admixed in the following proportions:

21.775 parts by weight amalgam.
5.628 parts by weight alloy.
72.597 parts by weight copper (extender).

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product. The compressed mass in a crucible conforming to the shape thereof is heated to an elevated temperature of about 10° C. above the melting, point of the mass and this temperature is maintained for about 10±1 minutes. In the oven utilized for heating, an inert atmosphere is maintained. Thereafter the crucible and its contents are transferred to a desiccator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.15 gallons of water per minute.

EXAMPLE VII

Preparation of Amalgam

An amalgam comprising 37.688 parts by weight of aluminum 32.112 parts by weight sodium and 30.2 parts by weight mercury is formed in a grahite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 60.7 parts by weight lead, 0.5 parts by weight ruthenium and 38.5 parts by weight germanium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by passing steam upwardly therethrough whereby steam is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere is maintained. Thereafter the mass comprised of amalgam and alloy is transferred to a dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender

The amalgam and alloy prepared above and an extender of powdered copper of about 10 mesh are admixed in the following proportions:

21.775 parts by weight amalgam.
5.608 parts by weight alloy.
72.617 parts by weight copper.

The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a desiccator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.12 gallons of water per minute.

EXAMPLE VIII

Preparation of Amalgam

An amalgam comprising 22.947 parts by weight of aluminum 18.391 parts by weight sodium and 58.662 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 63.064 parts by weight lead, 0.951 parts by weight osmium, 36.036 parts by weight antimony and 0.45 parts by weight germanium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by immersion in water whereby water is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere is maintained. Thereafter the mass comprised of amalgam and alloy is transferred to a dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender

The amalgam and alloy prepared above and a powdered extender comprising 50 wt.% tin and 50 wt.% bismuth of about 10 mesh are admixed in the following proportions:

21.775 parts by weight amalgam
5.653 parts by weight alloy
72.572 parts by weight extender The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.25 gallons of water per minute.

EXAMPLE IX

Preparation of Amalgam

An amalgam comprising 19.383 parts by weight aluminum, 31.068 parts by weight potassium and 49.549 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 42.847 parts by weight lead, 1.409 parts by weight rhodium, 42.847 parts by weight antimony, 2.429 parts by weight cadmium and 9.448 parts by weight zirconium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by spraying water on the admixture whereby water is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere, is maintained. Thereafter the mass comprised of amalgam and alloy is transferred to a dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender

The amalgam and alloy prepared above and an extender of powdered gallium of about 10 mesh are admixed in the following proportions:

21.775 parts by weight amalgam
5.678 parts by weight alloy
72.547 parts by weight gallium.

The weighing and blending of the foregoing metallic compounds should be done in an inert.atmosphere.

After blending to provide a uniform mixture, the resultant mixture is compressed to form a solid mass by application of pressure of about 40,000 pounds per square inch in a graphite mold conforming to the desired shape of the finished product.

The compressed mass is a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter, the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally, a 2.5 square cm surface will react with 0.08 gallons of water per minute.

EXAMPLE X

Preparation of Amalgam

An amalgam comprising 37.688 parts by weight aluminum, 32.112 parts by weight cesium and 30.2 parts by weight mercury is formed in a graphite crucible in an inert atmosphere of nitrogen at an elevated temperature of 200° C.

The resulting amalgam is cooled to room temperature in a dessicator in an inert nitrogen atmosphere. Thereafter, the amalgam is formed into a fine powder of about 10 mesh utilizing a ball mill. Grinding is effected in an inert atmosphere of nitrogen.

It is important to prepare the amalgam in an inert gas atmosphere to prevent hydroxide formation.

Preparation of Catalytic Alloy 60.7 parts by weight lead, 0.896 parts by weight palladium and 38.5 parts by weight germanium are introduced into a graphite crucible which is thereafter placed in an oven and heated to melting in an inert atmosphere of helium to form an alloy of said metals.

The resulting alloy is cooled in a dessicator to about room temperature in an inert helium atmosphere. Thereafter the amalgam is formed into a fine powder of about 10 mesh or less utilizing a ball mill. Grinding is effected in an inert atmosphere of helium.

The inert atmosphere is used to prevent oxidation of the alloy.

Formation of Intimate Amalgam and Catalytic Alloy Admixture

Three parts by weight of powdered amalgam is admixed with one part by weight powdered alloy in an inert atmosphere to obtain a uniform mixture of the amalgam and catalytic alloy.

The admixture may be utilized by passing steam upwardly therethrough whereby steam is dissociated into hydrogen and oxygen.

Formation of Reactor Block Comprising Amalgam and Catalytic Alloy

Three parts by weight of powdered amalgam is admixed with one part by weight powdered alloy. The weighing and blending is effected in an inert atmosphere.

After blending to provide a uniform mixture, the resultant mixture is compressed to form a solid mass by application of pressure of about 40,000 pounds per square inch in a graphite mold conforming to the desired shape of the finished product. The mold utilized produces a cubical block.

The resulting block is heated to an elevated temperature of about 10° C. above the melting point of the mass and maintained at said temperature for about 10±1 minutes. In the oven utilized for heating, an inert atmosphere is maintained. Thereafter the mass comprised of amalgam and alloy is transferred to dessicator wherein an inert atmosphere is maintained and the mass is allowed to cool. Upon cooling the resultant block is ready for use.

The entire foregoing procedure should be carried out in an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

Formation of Reactor Block Comprising Amalgam, Catalytic Alloy and Extender The amalgam and alloy prepared above and an extender of powdered copper of about 10 mesh are admixed in the following proportions:

21.775 by weight amalgam
5.630 parts by weight alloy
72.595 parts by weight copper The weighing and blending of the foregoing metallic compounds should be done in an inert atmosphere.

After blending to provide a uniform mixture, the resultant mixture is compressed to form a solid mass by application of pressure of about 40,000 pounds per square inch in a graphite mold conforming to the desired shape of the finished product.

The compressed mass in a crucible conforming to the shape thereof is heated to an elevated temperature of about 10° C. above the melting point of the mass and this temperature is maintained for about 10±1 minutes. In the oven utilized for heating, an inert atmosphere is maintained. Thereafter the crucible and its contents are transferred to a dessicator wherein an inert atmosphere is maintained. Upon cooling the resultant block is ready for use.

The entire foregoing procedure should be carried out under an inert atmosphere such as helium or nitrogen and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.22 gallons of water per minute.

Although the invention has been described in detail with respect to specific examples, it will be appreciated that various changes and modifications can be made by those skilled in the art within the scope of the invention as expressed in the following claims.

I claim:

1. A material for the generation of hydrogen and oxygen from water which comprises an amalgam of an alkali metal, mercury and aluminum wherein the atomic ratio of alkali metal to mercury is from about 3:1 to about 1:1.5 and the atomic weight ratio of alkali metal to aluminum is from about 1:1 to about 3:1 combined with an alloy of a metal selected from the platinum metals family and at least one element selected from the group consisting of germanium, antimony, gallium, thallium, indium, cadmium, bismuth, lead, zinc and tin.

2. The material of claim 1 further characterized in that the alkali metal is sodium or potassium.

3. The material of claim 1 further characterized in that the alloy contains antimony.

4. The material of claim 1 further characterized in that the alloy contains germanium.

5. The material of claim 1 further characterized in that the alloy also contains a metal selected from the group consisting of zirconium, chromium and mixtures thereof.

6. The material of claim 1 further characterized in that the alloy contains a metal selected from the group consisting of lead, gold and mixtures thereof.

7. The material of claim 1 further comprising copper.

8. The material of claim 1 further characterized in that the ratio, by weight, of alloy to amalgam is from about 1:1 to about 1:5.

9. The material of claim 8 further characterized in that the ratio, by weight, of alloy to amalgam is about 1:1 to about 1:3.

10. The material of claim 5 further characterized in that the alloy contains from about 0.7% to about 1.1% by weight chromium.

11. The material of claim 1 further characterized in that the each of the metallic components of the alloy present in said material is present in an amount of from about 0.4 to about 28.5 weight percent based upon the weight of alloy and amalgam combined.

12. The material of claim 1 further characterized in that said alloy comprises a metal selected from the platinum metal family present in an amount of from about 0.4 to about 2.3% by weight, lead present in an amount of from about 42.9 to about 71.5% by weight, antimony present in an amount of from about 25.5 to about 42.5% by weight, chromium present in an amount of from about 0.7 to about 1.1% by weight, zirconium present in an amount of from about 4.1 to about 6.8% by weight and gold present in an amount of from about 0.6% to about 2.3% by weight.

13. The material of claim 12 further characterized in that said alloy comprises about 1.4 wt.% of the selected member of the platinum family, about 57.3 wt.% lead, about 34.0 wt.% antimony, about 0.9 wt.% chromium, about 5.4 wt.% zirconium and about 1.0 wt.% gold.

14. A process for the generation of hydrogen and oxygen from water which comprises contacting water with an amalgam of an alkali metal, mercury and aluminum wherein the atomic ratio of alkali metal to mercury is from about 3:1 to about 1:1.5 and the atomic weight ratio of alkali metal to aluminum is from about 1:1 to about 3:1 combined with an alloy containing a metal selected from the platinum metal family.

15. The process of claim 14 further characterized in that the alkali metal is sodium, potassium or mixtures thereof.

16. The process of claim 14 further characterized in that the alloy comprises at least one metal selected from the group consisting of germanium, antimony, gallium, thallium, indium, cadmium, bismuth, lead, zinc and tin.

17. The process of claim 14 further characterized in that the alloy comprises at least one metal selected from the group consisting of germanium, antimony, gallium, thallium, indium and cadmium and the alkali metal of the amalgam is sodium.

18. The process of claim 17 further characterized in that the alloy contains antimony.

19. The process of claim 17 further characterized in that the alloy contains germanium.

20. The process of claim 17 further characterized in that the alloy also contains a metal selected from the group consisting of zirconium, chromium and mixtures thereof.

21. The process of claim 17 further characterized in that the alloy also contains a metal selected from the group consisting of lead, gold and mixtures thereof.

22. The process of claim 17 further comprising copper.

23. The process of claim 17 further characterized in that the ratio, by weight, of alloy to amalgam is from about 1:1 to about 1:5.

24. The process of claim 23 further characterized in that the ratio, by weight, of alloy to amalgam is about 1:1 to about 1:3.

25. The process of claim 20 further characterized in that the alloy contains from about 0.7% to about 1.1% by weight chromium.

26. The process of claim 17 further characterized in that each of the metallic components of the alloy present in said material is present in an amount of from about 0.4 to about 28.5 weight percent based upon the weight of alloy and amalgam combined.

27. The process of claim 14 further characterized in that said alloy comprises a metal selected from the platinum metal family present in an amount of from about 0.4 to about 2.3% by weight, lead present in an amount of from about 42.9 to about 71.5% by weight, antimony present in an amount of from about 25.5 to about 42.5% by weight, chromium present in an amount of from about 0.7 to about 1.1% by weight, zirconium present in an amount of from about 4.1 to about 6.8% by weight and gold present in an amount of from about 0.6 to about 2.3% by weight.

28. The process of claim 27 further characterized in that said alloy comprises about 1.4 wt.% of the selected member of the platinum metal family, about 57.3 wt.% lead, about 34.0 wt.% antimony, about 0.9 wt.% chromium, about 5.4 wt.% zirconium and about 1.0 wt.% gold.

* * * * *